United States Patent [19]
Hatch et al.

[11] 3,916,057
[45] Oct. 28, 1975

[54] INTUMESCENT SHEET MATERIAL

[75] Inventors: Robert A. Hatch, St. Paul; James R. Johnson, White Bear Lake, both of Minn.

[73] Assignee: Minnesota Mining and Manufacturing Company, St. Paul, Minn.

[22] Filed: Aug. 31, 1973

[21] Appl. No.: 393,587

[52] U.S. Cl. ............. 428/236; 106/15 FP; 106/286; 106/DIG. 3; 106/DIG. 4; 156/60; 162/155; 162/181 R; 166/57; 252/8.1; 252/378 R; 428/241
[51] Int. Cl.² ............................................ C09D 5/18
[58] Field of Search .......... 106/15 FP, 286, DIG. 3, 106/DIG. 4; 166/276, 57; 161/79, 82; 156/60; 252/8.1, 378 R; 162/155, 181 R

[56] References Cited
UNITED STATES PATENTS

| | | | |
|---|---|---|---|
| 2,125,286 | 8/1938 | Fletcher | 106/15 FP |
| 2,300,137 | 10/1942 | Salisbury | 106/15 FP |
| 2,390,732 | 12/1945 | Page | 106/15 FP |
| 2,509,599 | 5/1950 | Hollenberg | 106/15 FP |
| 2,569,399 | 9/1951 | Burns et al. | 106/15 FP |
| 2,756,159 | 7/1956 | Kendall et al. | 106/15 FP |
| 3,516,959 | 6/1970 | Jonas | 106/15 FP |

*Primary Examiner*—Edward G. Whitby
*Attorney, Agent, or Firm*—Alexander, Sell, Steldt & DeLaHunt

[57] ABSTRACT

An intumescent sheet material is provided containing vermiculite or other expandable mica. A process for mounting catalyst supports is described.

9 Claims, No Drawings

INTUMESCENT SHEET MATERIAL

This invention relates to an intumescent sheet material which is thermally resistant and is resilient after expansion. The invention further relates to the use of the intumescent sheet material as a packing in positioning catalyst supports within containers.

It has become recognized that catalytic devices are needed for (1) oxidation of carbon monoxide and hydrocarbons and (2) reduction of the oxides of nitrogen in automobile exhaust in order to control pollution. Due to the relatively high temperatures encountered in the catalyzed processes, ceramic has been the natural choice for catalyst supports. Particularly useful supports are provided by ceramic honeycomb structures as described, for example, in U.S. Pat No. 3,444,925.

Ceramic bodies tend to be frangible and to have coefficients of thermal expansion differing markedly from those of metal containers. Thus, the mounting of the ceramic body in the container must provide resistance to mechanical shock due to impact and vibration and to thermal shock due to thermal cycling. Both thermal and mechanical shock may cause deterioration of the ceramic support which, once started, quickly accelerates and ultimately renders the device useless. There is thus a need for method of mounting ceramic structures in metallic containers with resistance to mechanical and thermal shock. Moreover, because the life of the catalyst may be shortened because of fuel or engine characteristics, it is also desirable to be able to replace the ceramic catalyst support when exhausted without replacing the metallic housing or container. A simple method for mounting the catalyst support in a container would therefore be very useful.

It therefore appears that a packing material which would be adapted to absorb mechanical shock as well as thermal shock would be very desirable. For this purpose, inorganic materials appear especially suitable and in particular materials such as exfoliated vermiculite would seem to be especially suitable.

Vermiculite is well known in the art for its ability to exfoliate thermally or under the influence of micro waves with an expansion in volume of as great as 20 fold. An unexpanded synthetic tetrasilicic fluorine mica which expands significantly upon heating is described in U.S. Pat. No. 3,001,571.

Sheet materials such as paper have heretofore been known including exfoliated or "popped" mica of either the synthetic type (described in the cited patent) or of vermiculite as described in U.S. Pat. Nos. 2,204,581 and 3,434,917. Insulating and accoustical sheet materials are described in U.S. Pat. No. 2,481,391 which contain expanded vermiculite, and a light-weight firebrick containing expanded vermiculite is disclosed in U.S. Pat. No. 2,509,315.

Intumescent compositions have been described employing unexpanded vermiculite in combination with various materials. Thus, U.S. Pat. Nos. 2,526,066 and 3,744,022 disclose plaster wall board compositions containing unexpanded vermiculite. The incorporation of the unexpanded vermiculite into the wall board provides additional fire resistance but dehydration of the gypsum and expansion of the vermiculite together result in rapid impairment of the integrity of the board.

Unexpanded vermiculite is utilized in a fire-retardant mastic coating in U.S. Pat. No. 3,090,764 and exfoliation serves as insulation when the coating is exposed to fire. Both expanded and unexpanded vermiculite are used in fire-protecting coatings of asphaltic compositions described in U.S. Pat. No. 3,556,819 and roofing materials containing layers of unexpanded vermiculite or other intumescent materials are disclosed in U.S. Pat. Nos. 2,782,129 and 3,365,322.

None of the prior uses of vermiculite or other unexpanded materials appear to provide a probable solution to the problems encountered in automobile exhaust systems where prolonged resistance to thermal and mechanical shock is essential It is an object of this invention to provide an intumescent sheet material having resiliency such that it can withstand prolonged and repeated mechanical and thermal shock. Another object of the invention is to provide a method for mounting catalyst supports in containers. Other objects will become evident hereinafter.

In accordance with these and other objects of the invention, it has been found that a sheet material may be produced from unexpanded vermiculite, hydrobiotite, or water-swelling tetrasilicic fluorine mica using organic and/or inorganic binders to provide a desirable degree of wet strength. The sheet material can be produced to desirable thickness from about 0.1 to about 25 mm. by paper making techniques as will be described more fully hereinbelow.

Suitable inorganic binders may include tetrasilicic fluorine mica in either the water-swelling unexchanged form or after flocculation as the exchanged salt with a di- or polyvalent cation as well as fibrous materials such as asbestos. Organic binders may include small amounts of various polymers and elastomers, often added in latex form, as for example, natural or synthetic rubber latices.

The intumescent sheet material is utilized in automobile exhaust catalytic converters as a mounting material by expansion in situ. The expanded sheet then holds the ceramic core or catalyst support in place in the container or canister. The thermal stability and resilience of the sheet after exfoliation compensate for the difference in thermal expansion of the metal canister and the ceramic substrate, for vibration transmitted to the fragile device and for irregularities in the metallic or ceramic surfaces. The mounting material is found to be superior not only in that it is inexpensive and simple to use, but also it effectively solves the problems associated with thermal and mechanical shock inherent in such devices.

The sheet material may be formed by standard paper making techniques as described, for example, in U.S. Pat. No. 3,458,329 with respect to ceramic convertible papers. From 30 to 85% by weight of intumescent material, preferably unexpanded beneficiated flakes of vermiculite ore, hydrobiotite, or waterswelling synthetic tetrasilicic fluorine type mica are incorporated in the sheet either alone or in a combination of any of the three materials. Reinforcing agents (from 0 to 60% but preferably from 5 to about 60%), such as chrysotile or amphibole asbestos, soft glass fibers such as available under the tradename chopped E glass, refractory filaments including zirconia-silica fibers as described in U.S. Pat. No. 3,709,706, crystalline alumina whiskers and aluminosilicate fibers (available commercially under the tradenames Fiberfrax and Kaowool) or metal filaments are incorporated in order to provide integrity to the sheet material in the green state as well as in the finished intumescent sheet material and in the exfoliated sheet. From 10 to 70% by weight of inorganic binder is used in preparing the intumescent sheet material such as water-swellable synthetic mica microflakes (U.S. Pat. No. 3,001,571), asbestos, montmorillonite (bentonite, hectorite, or saponite) or kaolinite (ball clay). Synthetic mica and asbestos which are also included as components for other properties possess a sufficient ability at interlocking or conforming to other particles that are present that they can also serve in the second capacity as inorganic binders.

When synthetic mica is utilized as a binder, solution is prepared from unexchanged synthetic tetrasilicic fluorine mica or a suspension of exchanged synthetic mica may also be used. Concentrations may be varied over wide ranges up to 20% by weight or more. Synthetic tetrasilicic fluorine mica can be used as a binder in one of the other of two forms. If the unexchanged mica is used (i.e., usually the sodium or lithium form), flocculation is initiated by the addition of salts of divalent or trivalent cations, such as aqueous solutions of Ba(NO$_3$)$_2$, BaCl$_2$, Al$_2$(SO$_4$)$_3$, Al(NO$_3$)$_3$. On the other hand, if the exchanged mica (e.g. Ba$^{++}$, K$^+$, Ca$^{++}$, Mg$^{++}$, Sr$^{++}$, Pb$^{++}$, Al$^{+++}$, etc.) is used, flocculation is best achieved with non-ionic polyelectrolytes such as polyethylene imine or polyacrylamides such as commercially available Seperan NP10. Small amounts of organic or inorganic fibrous materials may be added to impart additional green strength to the green sheet material. The intumescent material, one or more reinforcing agents and binder are blended together followed by the flocculating agents. A small amount of surfactants or foaming agents may also be employed in order to improve the dispersion of the intumescent material without going beyond the scope of the invention. In order to avoid the use of asbestos in making the sheet, because of possible health hazards associated with this material, substitution of glass fiber materials or refractory (glass or crystalline) filaments or whiskers is possible without impairing the quality of the sheet. In general, asbestos fibers are less expensive than other fibers. The sheet is conveniently formed by standard paper making techniques either in a handsheet former on Fourdrinier screen although other methods are discussed below. The resulting green sheet is dried at about 90° C to form a handleable, flexible, resilient, intumescent sheet material. A strip of the dry sheet 2.5 cm wide and about 1.5–2.0 mm thick will support suspended loads up to 4.0 kg or more.

The resiliency of the intumescent sheet material is determined on 25 mm square samples by a modification of ASTM F-36-66 test in which the penetrator is replaced with an anvil 2 inches (5.1) square and the major load is reduced from 250 lb. (113 kg) to 27.5 lb. (12.5 kg). No control of humidity is maintained. The test is first to record the dial reading with no sample ($t_o$). The sample is inserted and surface irregularities are removed by applying a 5 lb. (2.26 kg) weight on the tray for 5 seconds. The dial reading ($t_1$) is recorded with only the gauge anvil and tray in place (total about 5.2 lb. or 2.36 kg). Then the major load as noted is applied and after 60 seconds the dial reading ($t_2$) is recorded and the load is removed and the dial reading ($t_3$) again recorded after a further 60 seconds.

$$\% \text{ compressability} = \frac{t_1 - t_2}{t_o - t_1} \times 100$$

$$\% \text{ recovery} = \frac{t_3 - t_2}{t_1 - t_2} \times 100$$

Compression of 10–35% and recovery up to about 40% are observed on the dry unexpanded sheet. The intumescent sheet is exfoliated at temperatures of about 200° to 600° C. The expanded sheet maintains its integrity and a 2.5 cm wide by 1.5–2.0 mm thick strip supports suspended loads of 2.5 kg or more and maintains its integrity up to 1200° C. Thermal expansion of the intumescent sheet material under a constant load of about 155 gm/cm$^2$ produces an expansion in the thickness of the sheet of about 3 to 100% or more depending upon the internal bond strength, rate of heating, and composition. In general, the higher the concentration of intumescent material in the sheet or the less load, the greater the expansion.

In employing an intumescent packing material with ceramic structures and particularly the present intumescent sheet materials, it is important to note that the force exerted against an unyieldable container during exfoliation of the intumescent sheet may be great enough to crush the ceramic substrate. Therefore, the thickness and resilience of the mat, its expandability and the gap between the ceramic substrate and the container must be considered in designing the intumescent sheet material. Having described the invention in general terms, it is now more specifically illustrated by examples.

This Example illustrates the ability of asbestos to act as an inorganic binder as later Examples illustrate its function as a fiber.

EXAMPLE 1

Water (1500ml) is poured into the mixing chamber of a large Waring blender and to it are added 80 gm of unexpanded vermiculite ore (No. 2 grade Zonolite, about 1–2 mm diameter, from W. R. Grace and Co.), 10 gm of soft glass fiber (2 mu type A - No. 363; Johns-Manville Corp.) as fibrous material, and 10 gm of chrysotile asbestos (7 RF-9; Carey Canadian Mines, Ltd.) as inorganic binder and the mixture blended for two minutes. Then, 80 ml of a 5% latex of butadiene acrylonitrile rubber (such as available under the Tradename Hycar 1562) 40 ml of a 10% wt/vol solution of aluminum sulfate and 20 ml. of a 1% solution of sodium polyacrylate-polyacrylamide (available as Separan NP10 from Dow Chemical Co.) are added sequentially at a relatively slow speed and after thorough blending, the mixture is poured onto a screen of a hand-sheet former (21.6 cm × 21.6 cm) and the drain is tripped. The drain time is about 35 seconds. The top surface is then blotted to absorb excess water and the formed sheet and screen are removed from the hand-former. Excess water is removed by combining with blotters in the sequence: blotter-sheet material-screenblotter and pressing at a pressure of about 10 gm/cm$^2$ for about a minute or more. The formed green sheet is then easily removed from the screen. It can be handled with no difficulty and is self supporting. The green sheet is further dried in a conventional photographic print drier.

The resulting dry green sheet is about 2.5 mm thick and is found to expand 87% under a load of 155 gm/cm$^2$ at a temperature of 550° C. The resulting expanded sheet is compressed 24% and the recovery is 6.5% as measured by the modified ASTM F-36-66 test described above.

Strips of this prepared sheet are placed in the space between an about 11.7 cm diameter cylindrical catalyst-impregnated ceramic substrate and an about 12.3 diameter cylindrical container. The assembly is heated to 600° C from room temperature at a rate of 300° C/hr to exfoliate the green sheet, resulting in a securely mounted ceramic core within the canister.

The efficacy of the intumescent sheet material of the invention for mounting ceramic structures in containers is compared with other mounting techniques by means of a test referred to as the Ejection Test in which the forces required to initiate and that to continue ejecting of a circular ceramic core from a cylindrical container are determined. A universal tester, such as an Instron, is used to determine the force required to eject the cores while the container-core assembly is maintained at 260° C with a ram speed of 1 cm/min. In each test, the force is raised to the point where the core begins to move. This initial force is considerably higher than the force required to continue movement and complete ejection of the core.

The following five methods of mounting are tested using 9.3 cm. diameter ceramic cores in 304 stainless steel cylinders of 10.2 cm. diameter. The results are tabulated in Table 1.

1. Stainless steel wire mesh mounting as described in U.S. Pat. No. 3,692,497.
2. Intumescent sheet material of the invention as described above.
3. Mat-Foam composition mounting described in co-pending application Ser. No. 313,272 of J. R. Close, R. A. Hatch, J. R. Johnson, and W. P. Wood having a common assignee with the present application.
4. Unexpanded vermiculite without binders pourer into the gap between ceramic substrate and container wall, and then expanded thermally.
5. Solid wall of a slurry of a cordierite in monoaluminum dihydrogen phosphate solution pourer into the gap between ceramic substrate and container wall and then heated to 600° C for several hours.

Table 1

| Mounting System | Initial Force Required (Newtons) | Sustaining Force Required (Newtons) |
| --- | --- | --- |
| 1 | 445 | 231 |
| 2 | 1710 | 1600 |
| 3 | 1020 | 890 |
| 4 | 196 | 187 |
| 5 | 18 | 13 |

The data in Table 1 show clearly that the process for mounting a ceramic structure in metal using an intumescent sheet material of the invention is significantly better than any of the other methods tested. The above tests further show the importance of forming an essentially integral structure by expansion of a sheet material. The poured vermiculite expands and holds the core in place but because there is no bond from particle to particle, the core can be forced out rather easily.

The mounting is also tested using a "hot-shake" test which is an extremely severe accelerated test. This test is performed on the catalytic canister assembly using an exhaust gas simulator, which simulates thermal conditions of exhaust gases from an engine, and with the assembly coupled to a vibrator which simulates the extreme vibration of automotive conditions. Failure of a mounting system is determined by measuring the time required to displace a core from the canister by about 3 mm. The displacement occurs as a result of mounting material failures produced by thermal shock, mechanical shock, or a combination of both. No data are available correlating the total hours on the "hot-shake" test equipment to miles of normal or test driving.

A test catalytic canister assembly is simultaneously tested for mechanical and thermal shock resistance by attaching the catalytic converter assembly to a Maremont Exhaust Gas Simulator, Model EGS-3, and a Martin Engineering Co. Vibrolator, Model CV-35. The exhaust gas simulator is set to produce $21 \pm 1$ m$^3$/min of propane exhaust gas at $845° \pm 27°$ C measured at the catalytic converter inlet and $900° \pm 27°$ C measured at the outlet. The Vibrolator produces a converter movement of about 3 mm at 40 Hz. Failure of the mounting was defined as time required to displace the core about 3 mm. Comparative testing shows that an assembly made according to U.S. Pat. No. 3,692,497 fails in an average of about 18 hours when Inconel X750 wire mesh is used and in only about 8 hours when stainless steel mesh is used. The assembly made according to the invention as described above with intumescent sheet material fails in an average of about 23 hours.

EXAMPLE 2

The following materials are blended for 2 minutes in a large Waring blender.
1000 ml water
70 gm unexpanded vermiculite ore (No. 4 grade Zonolite; about 0.2 to 0.8 mm diameter from W. R. Grace and Co.)
14 gm chrysotile asbestos as fibrous material (7 RF-9; Carey Canadian Mines, Ltd.)
21 gm alumino-silicate fibers as further fibrous material (Kaowool from Babcock and Wilcox)

Then, 630 gm of a 2% unexchanged synthetic tetrasilicic fluorine mica slurry which provides inorganic binder (12.6 gm) are added to the above mixture and blending is continued. Finally, a solution of 10 gm barium nitrate in water is added to the mixture as a flocculating agent and the blending is continued for about a minute. The resulting mixture is formed into a sheet and dried as described in Example 1. The dry sheet is about 4 mm thick and expands 15% under a load of 155 gm/cm$^2$ at a temperature of 550° C. The resulting expanded sheet is compressed 22% and shows recovery of 28% as measured by the modified ASTM F-36-66 test.

EXAMPLE 3

The procedure of Example 1 is repeated using 40 gm No. 4 grade unexpanded vermiculite in 750 ml. of water with 20 gm of chrysotile asbestos as fibrous material, 6.7 gm bentonite as binder and 7 ml each of 10% aluminum sulfate solution and 1% solution of Separan NP10 as flocculating agents. A dried sheet 2 mm thick is obtained which expands 19% at 550° C under 155 gm/cm$^2$ load, is compressed 16% and recovers 13% as measured by the modified ASTM F-36-66 test.

EXAMPLE 4

The procedure of Example 1 is repeated using 40 gm No. 4 grade unexpanded vermiculite in 650 ml of water with 6.7 gm of 0.5 to 0.7 micron soft glass fibers as fibrous material, 20 gm of bentonite as binder, and 7 ml each of 10% aluminum sulfate solution and 1% solution of Separan NP10 as flocculating agents. A dried sheet 2 mm thick is obtained which expands 8% at 350° C under 155 gm/cm$^2$ load, is compressed 18% and recovers 13% as measured by the modified ASTM F-36-66 test.

EXAMPLE 5

The procedure of Example 1 is repeated using 40 gm No. 4 grade expanded vermiculite in 650 ml of water with 13.3 grams alumino-silicate fiber as fibrous material, 13.3 gm of bentonite as binder and 7 ml each of 10% aluminum sulfate solution and 1% solution of Separan NP10 as flocculating agents. A dried sheet 1.5 mm thick is obtained which expands 19% at 530° C under 155 gm/cm$^2$ load, is compressed 18% and recovers 16% as measured by the modified ASTM F-36-66 test.

Hydrobiotite and synthetic tetrasilic fluorine micas may be used in place of all or part of the unexpanded vermiculite in procedures as described above for the preparation of useful sheet materials. Fibrous materials may be used in lesser amounts or even omitted entirely with large proportions of the synthetic micas.

When the sheet materials of Examples 2 through 5 are employed for mounting ceramic catalyst supports in containers as described in Example 1, it is found that the supports are securely mounted and withstand mechanical and thermal shock tests well.

EXAMPLE 6

The procedure of Example 1 is repeated using 650 ml water, 3.3 gm of glass fiber and 10 gm of alumino-silicate fiber as fibrous materials, 13.3 gm bentonite as binder and 40 gm No. 4 grade unexpanded vermiculite with 7 ml each of 10% aluminum sulfate solution and 1% solution of Separan NP10. The sheet drains in 40 sec. The dry sheet is about 2.0 mm thick and expands 3% under 155 gm/cm$^2$ load at 550° C. The expanded sheet compressed 11% and recovers 20% in the ASTM F-36-66 test modified as described above. Without load the dry sheet expands 150% (to 5 mm) at 650° C.

Double layers of the above sheet are placed in the space between an 11.8 cm diameter cylindrical catalyst impregnated ceramic core and a 12.7 cm diameter cylindrical stainless steel container and after first heating for 3 hours at 120° C expansion is completed by heating for ½ hour at 600° C to give a securely mounted core. In the hot-shake test described in Example 1, this mounted catalytic canister does not fail for 20 hours or more.

The following examples illustrate an embodiment for the production of intumescent sheets in which, instead of applying the paper making slurry to a screen or hand sheet former as in conventional papermaking, a much more concentrated slurry with a spreadable consistency is produced and then coated or extruded on sheet material such as kraft paper, polyethylene tetraphthalate fiber, glass mat or fabric or other sheet material which may serve as a carrier or even on the outer surface of a ceramic substrate, using knife coating, roll coating, dip coating or other methods as are convenient. The principle disadvantage of coating a ceramic directly is that it is relatively difficult to control the thickness of the dry coating and, as noted above, too thick a layer may actually crush the ceramic when heated to expand the vermiculite.

In the Examples tabulated in Table 2, the dry materials totaling 100 gm are blended dry with a spatula and water is then added to give a spreadable consistency in the amount indicated. The non-flowable paste is hand spread on a 7.5 × 48 cm strip of the indicated substrate to a thickness of about 1 to 3 mm and the sheet is then dried at 75° C. The sheets are not as flexible as those produced in Examples 1–5 inclusive but are self-supporting and reasonably strong. When moistened, they can be wrapped around a ceramic structure for mounting it in a container. If desired, the substrate on which the material is coated may be provided with a low-adhesion sizing so that it can be separated from the intumescent sheet material or it may often be removed by peeling.

Table 2

| Example | 7 | 8 | 9 | 10 | 11 |
|---|---|---|---|---|---|
| hectorite clay (gm) | 30 | 30 | — | 15 | 10 |
| bentonite clay (gm) | — | — | 30 | — | — |
| No. 2 grade vermiculite (gm) | 65 | 65 | — | 80 | — |
| No. 4 grade vermiculite (gm) | — | — | 60 | — | 80 |
| soft glass fiber stands (6 mm large)(gm) | 5 | 5 | 10 | 5 | — |
| Chrysotile asbestos (gm) | — | — | — | — | 10 |
| Water (ml) | 250 | 250 | 140 | 140 | 125 |
| Substrate | Kraft Paper | Glass Fiber Fabric | Plastic* Film | Kraft Paper | Kraft Paper |
| Dry Weight (total gm) | 62 | 41.5 | 59 | 82 | 81 |
| Ejection test of Example 1 (Newtons) | | | | | |
| Initial | 1085 | — | 467 | 1800 | — |
| Sustaining | 832 | — | 400 | 1450 | — |

*Plastic = polyethylene terephthalate

What is claimed is:

1. A handleable, flexible, resilient intumescent sheet material consisting essentially of from 30 to 85% by weight of unexpanded vermiculite, from 0 to 60 % by weight of inorganic fibrous material and from about 10 to 70% of inorganic binder, said sheet material having a compressability of 10 to 35% and recovery up to about 40% when tested under a load of 27.5 pounds using a 2 inch square anvil in modified ASTM F-36-66 test.

2. An intumescent sheet material according to claim 1 of a thickness of 0.1 to 10 mm.

3. An intumescent sheet material according to claim 1 in which there is from 5 to 60% of inorganic fibrous material.

4. An intumescent sheet material according to claim 1 in which the inorganic binder is hectorite, bentonite, asbestos or synthetic tetrasilicic fluorine mica.

5. An intumescent sheet material according to claim 2 in which the inorganic fibrous material is asbestos, soft glass fiber or refractory alumino-silicate fiber.

6. An intumescent sheet material according to claim 1 having a backing sheet of kraft paper, plastic film or inorganic fiber fabric.

7. An intumescent sheet material according to claim 2 wherein the inorganic fibrous material is soft glass fiber and the inorganic binder is chrysotile asbestos.

8. An intumescent sheet according to claim 6 wherein the expandable mica is vermiculite, the inorganic fibrous material is soft glass fiber, the inorganic binder is hectorite and the backing sheet is kraft paper.

9. A process for the mounting of a ceramic structure in a metallic container comprising the steps of providing at least one thickness of an intumescent sheet material between said ceramic structure and said container, said intumescent sheet material being about 0.1 to 10 mm thick and comprising a composition containing from 30 to 85% by weight of expandable mica, 10 to 70% of inorganic binder and 0 to 60% of inorganic fibrous material.

* * * * *